US010158739B2

(12) United States Patent
Bauer et al.

(10) Patent No.: US 10,158,739 B2
(45) Date of Patent: Dec. 18, 2018

(54) SYSTEM AND METHOD FOR INTERCHANGING DATA WITH LASER OR MACHINE TOOL APPARATUSES

(71) Applicant: TRUMPF Werkzeugmaschinen GmbH + Co. KG, Ditzingen (DE)

(72) Inventors: Klaus Bauer, Ditzingen (DE); Hans-Peter Bock, Tamm (DE); Christian Goerg, Moeglingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 15/856,636

(22) Filed: Dec. 28, 2017

(65) Prior Publication Data
US 2018/0124200 A1 May 3, 2018

Related U.S. Application Data

(63) Continuation of application No. PCT/EP2016/064658, filed on Jun. 24, 2016.

(30) Foreign Application Priority Data

Jun. 29, 2015 (DE) .................. 10 2015 212 074

(51) Int. Cl.
H04L 29/08 (2006.01)
G05B 19/18 (2006.01)
G06F 21/10 (2013.01)

(52) U.S. Cl.
CPC .......... H04L 67/2842 (2013.01); G05B 19/18 (2013.01); G06F 21/105 (2013.01); H04L 67/12 (2013.01); H04L 67/34 (2013.01)

(58) Field of Classification Search
CPC .................................................. G08C 17/02
See application file for complete search history.

(56) References Cited

U.S. PATENT DOCUMENTS

2002/0167961 A1* 11/2002 Haartsen ............... H04W 72/10
370/444
2007/0127429 A1 6/2007 Bryan et al.
(Continued)

FOREIGN PATENT DOCUMENTS

DE 102011089499 6/2013
DE 102013220865 4/2015
(Continued)

OTHER PUBLICATIONS

International Search Report and Written Opinion in Application No. PCT/EP2016/064658, dated Oct. 24, 2016, 24 pages (with English translation).
(Continued)

Primary Examiner — Ross Varndell
(74) Attorney, Agent, or Firm — Fish & Richardson P.C.

(57) ABSTRACT

A system for transmitting data between laser apparatuses or machine tool apparatuses that have communication devices. The system includes a first laser or machine tool apparatus with a first communication device for setting up a first connection that is a local wireless point-to-point connection, and a second laser or machine tool apparatus including a second communication device for setting up a second connection that is a local wireless point-to-point connection, and a mobile terminal. The mobile terminal includes a terminal data memory, and a terminal communication device for setting up local wireless point-to-point connections to the first apparatus and the second apparatus. The system is configured to transmit data of the first apparatus through the first connection to the mobile terminal, buffer-store the data in the terminal data memory, and, after the first connection terminates, transmit the data from the mobile terminal through the second connection to the second apparatus.

20 Claims, 2 Drawing Sheets

(56) References Cited

U.S. PATENT DOCUMENTS

| | | | | |
|---|---|---|---|---|
| 2010/0127824 A1* | 5/2010 | Moschl | ............. | G05B 19/4184 |
| | | | | 340/5.65 |
| 2013/0103200 A1* | 4/2013 | Tucker | ................ | G01C 21/206 |
| | | | | 700/275 |
| 2014/0180464 A1* | 6/2014 | Koerber | ................ | G05B 19/18 |
| | | | | 700/159 |
| 2014/0285325 A1 | 9/2014 | Umetani et al. | | |

FOREIGN PATENT DOCUMENTS

| | | |
|---|---|---|
| EP | 1429217 | 6/2004 |
| EP | 2617529 | 7/2013 |
| WO | WO 2006105567 | 10/2006 |
| WO | WO 2017/001295 | 1/2017 |

OTHER PUBLICATIONS

German Search Report in Application No. 102015212074.0, dated Apr. 29, 2015, 18 pages (with English translation).

\* cited by examiner

SYSTEM AND METHOD FOR INTERCHANGING DATA WITH LASER OR MACHINE TOOL APPARATUSES

CROSS-REFERENCE TO RELATED APPLICATIONS

This application is a continuation of and claims priority under 35 U.S.C. § 120 from PCT Application No. PCT/EP2016/064658 filed on Jun. 24, 2016, which claims priority from German Application No. DE 10 2015 212 074.0, filed on Jun. 29, 2015. The entire contents of each of these priority applications are incorporated herein by reference.

TECHNICAL FIELD

The invention relates to a system and a method for data interchange between a first laser apparatus or machine tool apparatus (or with a machine controller or a control computer of the apparatus) and a second laser apparatus or machine tool apparatus. The laser apparatuses may be a laser and the machine tool apparatus may be a laser machine or a machine tool, such as e.g. a punching machine.

BACKGROUND

In order to interchange data between multiple laser or machine tool apparatuses, between such apparatuses and an apparatus manufacturer, or between such apparatuses and a mobile terminal (e.g. smartphone), may require a shared network, a server in the network, or the apparatuses may be otherwise Internet-accessible. Conventionally, laser or machine tool apparatuses are generally not connected to a network. If connected to a network such apparatuses are provided only with limited access (for example, to file locations containing product orders) and therefore e.g., are not able to communicate with one another or to access the Internet. Thus, in conventional systems, simple processes such as fault reports, condition monitoring, status reports, updates, etc. and elegant evaluations are prevented and necessitate service calls in situ.

In the absence of a network or Internet connection, a laser or machine tool apparatus is also not able to determine its location autonomously. Similarly, in spite of an Internet connection, it is a problem for some apparatuses to find out the current time, since firewalls prevent communication with time servers on the Internet. Current location and time data therefore have to be updated manually on a regular basis or in the event of a change.

SUMMARY

One object of the present invention is based on specifying a system and a method for data interchange between a first laser or machine tool apparatus and a second laser or machine tool apparatus that are not connected to a network (for example, an external network), or are connected only to a limited network. A limited network does not allow connection of the apparatus to other apparatuses or to particular (external) networks to allow data interchange (e.g. data synchronization) with another apparatus or other computers/devices to which the apparatus has no direct data connection.

This object is achieved by a system for transmitting data. The system includes a first laser apparatus or machine tool apparatus that has a first communication device for setting up a first local wireless point-to-point connection, a second laser apparatus or machine tool apparatus that has a second communication device for setting up a second local wireless point-to-point connection, and a mobile terminal. The mobile terminal has a data memory and a terminal communication device for setting up local wireless point-to-point connections to the first and the second apparatuses. The system is configured to transmit data of the first apparatus via the first local wireless point-to-point connection to the mobile terminal, and buffer-store the data in the data memory. After the end of the first point-to-point connection, the system transmits these buffer-stored data from the mobile terminal via the second local wireless point-to-point connection to the second apparatus.

It is thus possible for apparatuses that are never connected in a network together to be synchronized with one another using the mobile terminal. Provided that the mobile terminal is also in the reception area of the second apparatus at the same time, data of the first apparatus can also simultaneously, that is to say without buffer-storage, be forwarded from the mobile terminal via the second local wireless point-to-point connection to the second apparatus. There, the transmitted data are collated. For example, if the second apparatus is of the same type as or of a similar type to the first apparatus, condition monitoring data of the first apparatus can be useful to improve the apparatus servicing of the second apparatus. This synchronization can be advantageously performed in an automated fashion and, even in the absence of a direct data connection between the two apparatuses, keeps the apparatuses up to date by virtue of eliminating the need for the users to frequently change between apparatuses for loading and unloading, programming and other activities.

In some implementations, a mobile terminal (e.g., tablet computer, laptop, smartphone, etc.), after entering the surroundings (e.g., reception range) of an apparatus that is not connected to an (external) network or is connected to a network that does not permit a connection to other apparatuses or to particular (external) networks, sets up a point-to-point connection to the apparatus. The mobile terminal either downloads data from or uploads data to the apparatus. In some examples, the data is interchanged directly between the mobile terminal and the apparatus using ad hoc connections, for example, via a wireless short-range transmission link. In some implementations, the data downloaded from the apparatus are buffer-stored in the data memory of the mobile terminal and later transmitted to the external data interface. In some implementations, the data uploaded to the apparatus have previously been transmitted from an external data interface to the mobile terminal and buffer-stored in the data memory therein.

In some implementations, the downloaded apparatus data includes condition monitoring data. For example, the data includes current measured values of a sensor system that monitors the state of quality of an apparatus component (e.g., tools, drives, optical systems, process gas nozzle, etc.), fault reports, status reports, apparatus data acquisition (MDE), operational data acquisition (BDE) or servicing data such as when a component has been replaced or should have been replaced. In some implementations, the downloaded data can be displayed on the mobile terminal and evaluated, or be forwarded from the mobile terminal via a network (Internet) to an apparatus manufacturer for evaluation. The uploaded data are, for example, current condition monitoring data, such as updated limit values for the sensor system or updated servicing intervals, for improving apparatus servicing. In some implementations, the data to be uploaded have been transmitted from the apparatus manufacturer to the mobile terminal, for example, via a connected network.

The invention has several advantages, for example:
no Internet access to and from the apparatus is necessary;
no direct networking and components in a customer network is necessary;
connections to the apparatus can be set up automatically and in the background;
notifications from multiple apparatuses in the environment can be displayed in parallel and, if desired, without a separate device, (e.g., a separate display device);
faults in the customer network (e.g., the Internet) do not interfere with the communication;
there are no conflicts with security policies that relate to network communication.

In some implementations, a server, such as an apparatus manufacturer server, has an external data interface to transmit data of the apparatus manufacturer to the mobile terminal and to receive data of the apparatus from the mobile terminal.

In some implementations, the communication devices of the apparatuses and the terminal communication device of the mobile terminal are configured as Bluetooth interfaces for setting up a Bluetooth connection or as Wireless Local Area Network (WLAN) interfaces for setting up a WLAN connection. Bluetooth LE (LowEnergy) can be used as a very interference-immune connection, the apparatus being peripheral and the mobile terminal being central. This means that the apparatus can transmit advertisement packets with an explicit UUID (Universally Unique Identifier) and a mobile terminal can connect to said apparatus. An application (or "app") installed on the mobile terminal can then look for an apparatus with this UUID. In some implementations, the mobile terminal has a notification app installed on it that activates the Bluetooth LE hardware of the mobile terminal when started up for the first time. In some examples, the app registers for events when the Bluetooth LE hardware finds a peripheral with the UUID. In some examples, if the mobile terminal is within the reception area (e.g., a reception range) of the Bluetooth of the apparatus and receives the advertisements as a result, the app is activated in the background, and connects to the apparatus. In some examples, the app provides an option to set which notifications are meant to be received, and to display more detailed information (e.g., current state, history, etc.).

In some implementations, the at least one apparatus has a data memory for storing the data to be transmitted to the at least one mobile terminal.

In a further aspect, the invention also relates to methods for data interchange between a first laser apparatus or machine tool apparatus and a second laser apparatus or machine tool apparatus via a mobile terminal. The data interchange from the first apparatus to the second apparatus includes: setting up a first local wireless point-to-point connection between the first apparatus and the mobile terminal, transmitting data of the first apparatus to the mobile terminal via the first connection, buffer-storing the transmitted data in the mobile terminal and terminating the first connection, and subsequently, setting up a second local wireless point-to-point connection between the mobile terminal and the second apparatus, transmitting the data buffer-stored in the mobile terminal from the mobile terminal via the second connection to the second apparatus and terminating the second connection.

In some implementations, the data transmission between the first apparatus and the mobile terminal, on one hand, and between the second apparatus and the mobile terminal, on the other hand, is performed in time-staggered fashion.

In some examples, at least one of the apparatuses transmits a wireless signal that is used for setting up the wireless point-to-point connection. In some examples, at least one of the local wireless point-to-point connections between the respective apparatus and the mobile terminal is set up on the basis of the strength of the wireless signal as received at the mobile terminal. In some examples, the connection is set up to the apparatus whose received signal is strongest or to the apparatus that is closest to the mobile terminal based on position determination, for example, by sensing the signal strength of at least two wireless signals. As a result, it is possible to disconnect point-to-point connections, and set them up again, in automated fashion, e.g., if it has been identified that another apparatus is substantially closer than the apparatus that is currently connected to the mobile terminal.

In some implementations, a server, for example, an apparatus manufacturer server, has an external data interface. The data transmitted from the apparatus to the mobile terminal can thus be transmitted from the mobile terminal to the manufacturer server to be evaluated there. Conversely, data can be transmitted from the manufacturer server to the mobile terminal for further transmission to the at least one apparatus. It is thus possible for data to be transmitted between apparatus manufacturer and apparatus, which are not connected in a network together, using the mobile terminal.

In some implementations, current location data and/or current time data of the mobile terminal are transmitted to the at least one apparatus. In some examples, the mobile terminal retrieves its position, e.g. by using GPS (Global Positioning System) satellites and/or the closest mobile radio mast, and discovers from a connection to the Internet which country it is in. When the mobile terminal then connects to an apparatus, it can thus notify the apparatus where it is located, so that the apparatus can perform country-specific adjustments (e.g. time, language, country-specific standards and requirements). This feature is useful, for example, when the apparatus has been sold on second hand, or when the apparatus manufacturer has no influence on where apparatus is set up. Accordingly, operation of the apparatus components is improved and manual configuration complexity is decreased. The transmission of current location and time data has several further advantages, such as:

no user input is necessary;
the apparatus requires no networking in a customer network and no Internet access;
the likelihood of a misconfiguration is reduced;
the apparatus identifies a change of location automatically;
services on the apparatus are autonomously localized for the current location;
the country setting is set correctly.

Alternatives to passwords for authentication on apparatuses (e.g. for changing the user level) often entail considerable management complexity, especially if apparatuses do not (cannot) regularly make contact with a central server to update an internal rights database. In the case of hardware, such as RFID (Radio-Frequency Identification) chips, it is a logistical problem to distribute these (i.e. hardware) to all users. According to some implementations of the invention, it is possible, even in the absence of an external network or in the event of limited network or Internet access for the apparatus, for access data for certifying the mobile terminal to be transmitted from the mobile terminal to the apparatus.

In some implementations, after the mobile terminal enters the reception range of the communication device of the at least one apparatus, the point-to-point connection is automatically set up between the apparatus and the mobile terminal. After setup of the point-to-point connection, the data can be automatically transmitted between the at least one apparatus and the mobile terminal.

The invention also relates to a computer program product, such as an app, for loading onto a mobile terminal. The product has code means that are adapted to perform the method according to the invention when the program runs on a computing device, such as a mobile terminal.

Further advantages and advantageous refinements of the subject matter of the invention will emerge from the description, the claims and the drawing. Similarly, the features cited above and those presented further can likewise be used in each case by themselves or as a plurality in arbitrary combinations. The embodiments shown and described should not be understood as an exhaustive enumeration, but rather are of exemplary character for portraying the invention.

DETAILED DESCRIPTION

Figure 1:
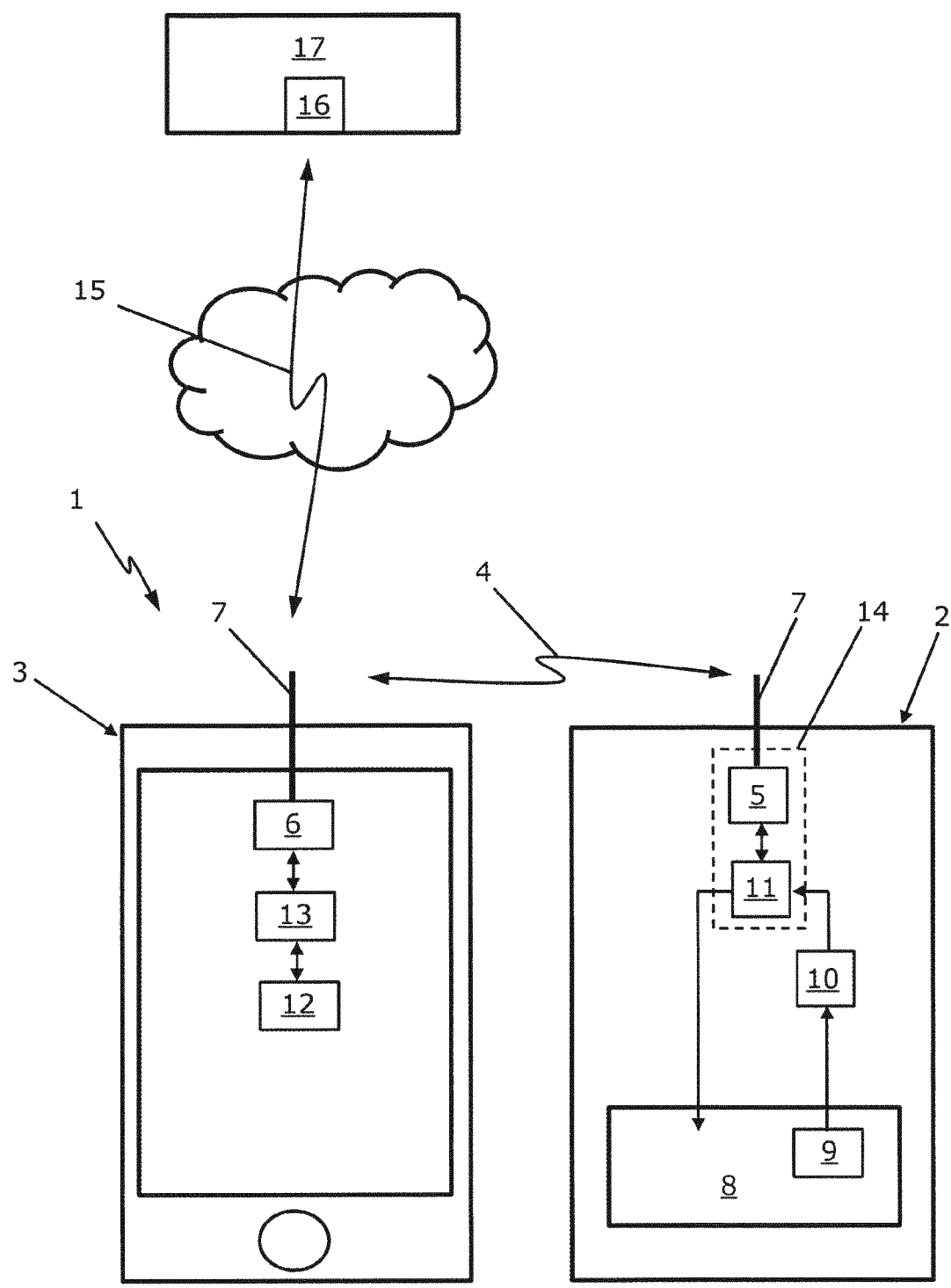
FIG. 1 schematically depicts a system according to an implementation of the invention for data interchange with a laser apparatus or machine tool apparatus that is not connected to an (external) network.

The system 1 shown in FIG. 1 is used for transmitting data between an apparatus 2 (e.g. a laser or a machine tool) that is not connected to a network (for example, an external network such as the Internet), and is connected to a mobile terminal (e.g. smartphone) 3 via a local wireless point-to-point connection 4. To set up this point-to-point connection 4, the apparatus 2 and the mobile terminal 3 each have a communication device 5, 6 that has appropriate transmission/reception units, as schematically indicated by antennas 7.

The apparatus 2 includes a data source 9—depicted here merely by way of example as part of a machine controller 8 of the apparatus 2—that generates current data, such as e.g. fault reports, condition monitoring data, status reports, MDE/BDE data, etc. The apparatus 2 further includes a data memory 10 used to store data from data source 9, and a data transmission controller 11 connected to the data memory 10. The data transmission controller 11 is to use the communication device 5 to send the data stored in the data memory 10 to a mobile terminal 3 or to receive data from a mobile terminal 3. The mobile terminal 3 likewise includes a data transmission controller 13 connected to a data memory 12 to use the communication device 6 to send the data stored in the data memory 12 to an apparatus 2 or to receive data from an apparatus 2. The communication device 5 and the data transmission controller 11 are altogether referred to as data interface 14.

As soon as there are data in the data memory 10 of the apparatus 2, the data transmission controller 11 of the apparatus 2 activates the communication device 5 in order to look for mobile terminals 3. If there is a mobile terminal 3 in the reception area of the apparatus 2, a point-to-point connection 4 is set up between the communication devices 5 and 6 of the apparatus 2 and the mobile terminal 3, respectively. The data stored in the data memory 10 are then transmitted from the apparatus 2 via the point-to-point connection 4 to the mobile terminal 3 and buffer-stored in the data memory 12 of the mobile terminal 3. In some implementations, the transmitted data can be visualized on the mobile terminal 3 itself and evaluated by a software component. In some implementations, the transmitted data can be transmitted at the end of the point-to-point connection 4, for example, in time-staggered fashion, from the mobile terminal 3 via an Internet connection 15 to an external data interface 16 of a server 17 of an apparatus manufacturer or operator, to be evaluated there. An evaluation additionally affords the opportunity to display more detailed information pertaining to for example, a notification, the current apparatus state, a history, etc.

As soon as data for one or more apparatuses 2, e.g., data transmitted from the server of the apparatus manufacturer or operator via an Internet connection 15 to the data memory 12, are buffer-stored in the data memory 12 of the mobile terminal 3, the data transmission controller 13 of the mobile terminal 3 activates the communication device 6 to look for the applicable apparatuses 2. If there is an apparatus 2 in the reception area of the mobile terminal 3, a point-to-point connection 4 is set up between the communication devices 5 and 6. The data buffer-stored in the data memory 12 is then transmitted from the mobile terminal 3 via the point-to-point connection 4 to the apparatus controller 8. The data stored in the data memory 12 may be Numerical Control (NC) data, for example, that have arrived by E-mail, and information regarding the apparatus for which said NC data are meant to be available.

When there is an existing point-to-point connection 4 between apparatus 2 and mobile terminal 3, data can also be transmitted on an event basis. It is thus not necessary for the one communication device to actively request data from the other communication device, but rather a communication device automatically receives new data when they are available.

The data interchange between an apparatus 2 that is not connected to a network and a mobile terminal 3 has several advantages, for example:
- data protection is improved with minimal setup, since the data aggregation requires no communication through a network (e.g. Internet);
- the setup is scalable from one apparatus to n apparatuses;
- no configuration is necessary;
- no problems arise as a result of faults in an apparatus operator network.

In some implementations, a communication protocol such as Bluetooth LE is used. The communication protocol provides for simple contact-making between the communication devices 5 and 6 of the apparatus 2 and of the mobile terminal 3. In some implementations, the apparatus 2 has an active notification manager (for example, a Windows service) that waits for local connections from notification sources (e.g. condition monitoring managers). The notification manager collects the notifications and sends them to a Bluetooth LE hardware of the communication device 5 of the apparatus 2. When a notification source is connected, the notification manager activates a Bluetooth advertisement and advertises its data.

In some implementations, the mobile terminal 3 has a notification application of the apparatus manufacturer. Said notification application activates the Bluetooth LE hardware of the communication device 6 of the mobile terminal 3 when the application is started for the first time. The application registers for events when the Bluetooth LE hardware finds a peripheral with the UUID of the apparatus manufacturer. If the mobile terminal 3 is within the reception area of the Bluetooth of the apparatus 2 and receives an advertisement as a result, the application is activated in the background and connects the mobile terminal 3 to the apparatus 2. Notifications can then be presented as a local notification, e.g., using the Notification Center of iOS. In some implementations, the application provides an option to set which notifications are meant to be received, and if needed, inquires for an authorization regarding the apparatus 2.

The mobile terminal 3 can access the local time and its current location via the Internet. The location information can be an approximate position determined by GSM (Global System for Mobile communication), WLAN, or GPS. If the apparatus 2 cannot determine its current location and the current time autonomously, these data can be transmitted from the mobile terminal 3 to the apparatus 2 and be adopted when a point-to-point connection 4 exists. If this information is on hand from multiple mobile terminals 3, then the best time or the best location can be found, e.g., by a majority decision. This allows the apparatus to operate with the correct country-specific settings (for example, regarding WLAN channels, alternative security settings).

In some implementations, the mobile terminal 3 can also be used for authentication. For example, the mobile terminal 3 is provided with a certificate that the mobile terminal 3 can use to identify itself to an apparatus 2. The certificate is provided by a central server, with user management, by a network (e.g., through E-mail, Internet).

In some implementations, the mobile terminal 3 has a software component for certificate updating. In some examples, the software component sets up a connection to a certificate issuing component (e.g., a central software component) for certificate issuing. In some implementations, the mobile terminal 3 stores access data for the certificate issuing, or access data are requested from the user. In some examples, the mobile terminal 3 sends the access data and an ID, which is individual to the software component and the mobile terminal 3, to the certificate issuing component in encrypted fashion. The certificate issuing component checks the access data against an authorization database and, if the user has authority, produces a certificate. In some implementations, the certificate includes a user data, the individual ID, the authorizations and an expiry date. In some implementations, the certificate is cryptographically signed using a private key. The certificate is then returned to the mobile terminal 3, for example, in encrypted fashion. In some examples, the certificate is stored in a certificate memory of the mobile terminal 3 for later use.

In some implementations, a key memory in the apparatus 2 stores a public key that together with a previously used private key in the central server, forms a key pair. In some implementations, the apparatus 2 has a test component that can test certificates that have been produced by the certificate issuing component, for authenticity and can give clearances on the basis of authorizations. A point-to-point connection 4 that has been set up is used to transmit the certificate from the mobile terminal 3 to the apparatus 2. In some implementations, the test component tests whether a signature has been produced by checking whether the private key matches apparatus 2's public key, whether the expiry date has not yet been exceeded, and whether the authorizations can be used on the apparatus 2. If this is the case (and the signature has been produced), the mobile terminal 3 is signaled and the available authorizations are communicated to mobile terminal 3. The mobile terminal 3 can communicate the desired authorization that is to be set, to the apparatus 2 using the same communication path.

This authentication of a mobile terminal 3 on an apparatus 2 that is not connected to a network has several advantages, for example:
  no local user management is required;
  the apparatus does not have to be networked in order to look after authorizations;
  mobile terminals on hand can be used for this authentication;
  an engineer who needs service authorizations only requires a user account with the apparatus manufacturer for this purpose;
  the system can also be provided to the apparatus operator for use.

Figure 2:
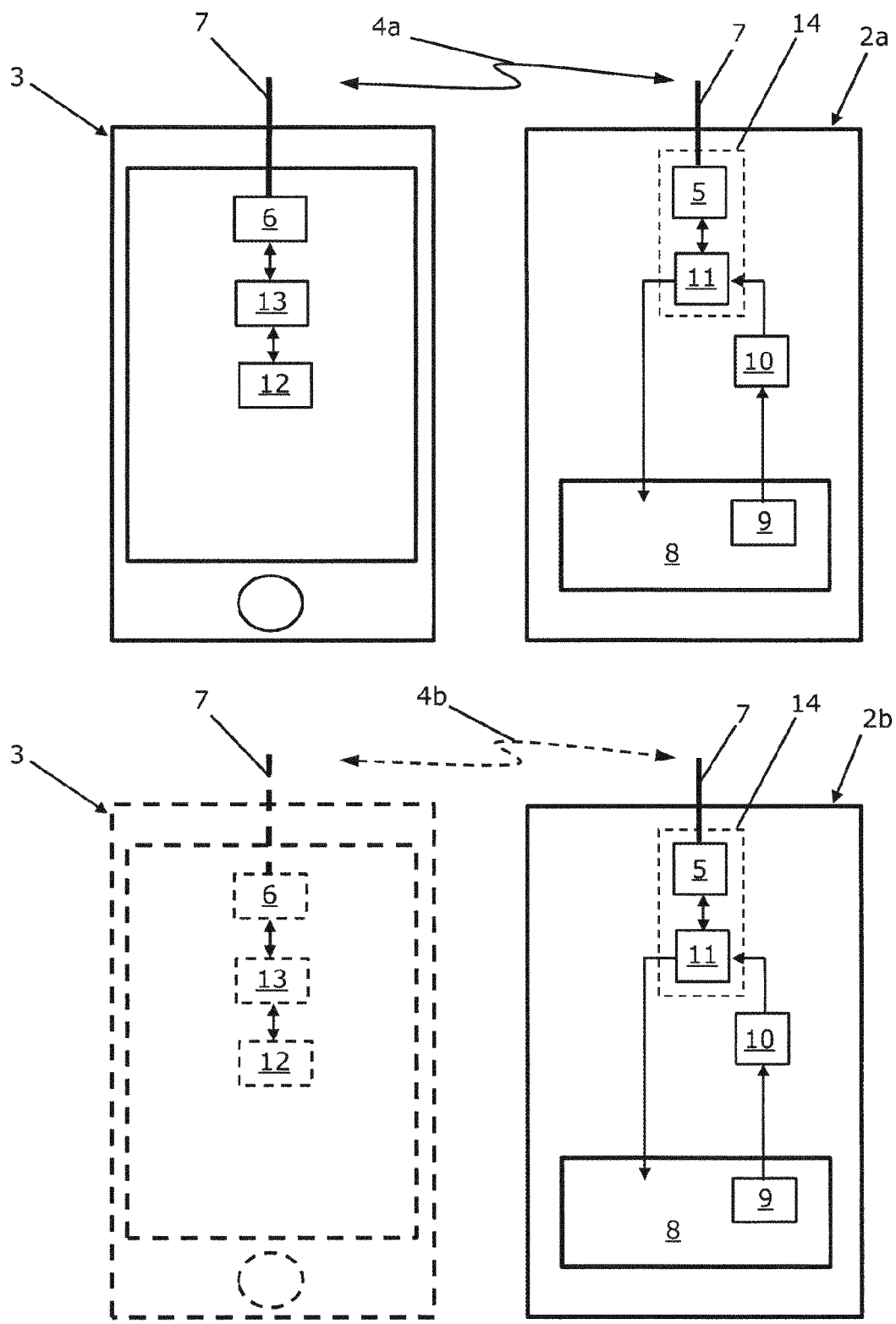
FIG. 2 schematically depicts a system according to an implementation of the invention for data interchange between two laser or machine tool apparatuses that are not connected to one another via a shared network.

FIG. 2 shows the data interchange between two apparatuses 2a, 2b that are not connected to one another via a shared network.

When the data memory 10 of the first apparatus 2a contains data that are meant to be transmitted to the second apparatus 2b, the data transmission controller 11 of the first apparatus 2a activates its communication device 5 in order to look for mobile terminals 3. If there is a mobile terminal 3 in the reception area of the first apparatus 2a, a first point-to-point connection 4a is set up between the communication devices 5 and 6 of the first apparatus 2 and the mobile terminal 3. The data stored in the data memory 10 of the first apparatus 2 are then transmitted from the first apparatus 2 via the first point-to-point connection 4a to the mobile terminal 3 and are buffer-stored in the data memory 12 therein. After termination of the first point-to-point connection 4a, the buffer-stored data are transmitted from the mobile terminal 3 via a second local wireless point-to-point connection 4b to the second apparatus 2b or to an external data interface 14, which is external to the first apparatus 2a, on the second apparatus 2b.

In some implementations, if it has been identified that another apparatus is substantially closer than the apparatus that is currently connected to the mobile terminal, the two apparatuses 2a, 2b can each transmit a wireless signal that is used to set up the wireless point-to-point connection 4a, 4b to disconnect from point-to-point connections 4a, 4b, and set them up again in automated fashion. In some implementations, at least one of the local wireless point-to-point connections 4a, 4b between one of the apparatuses 2a, 2b and the mobile terminal 3 is set up on the basis of the strength of the wireless signal as received at the mobile terminal 3. For example, the connection is preferably set up to that apparatus 2a, 2b whose received signal is strongest or to that apparatus 2a, 2b that is closest to the mobile terminal 3 based on position determination by sensing a signal strength of at least two wireless signals. In some examples, an Indoor Positioning System (IPS) can be used. By using the IPS, rooms are mapped and position of the first or second apparatus in the room is determined by virtue of detection of signal strength of transmitters (e.g., of the first or second apparatus) with known positions.

A number of embodiments of the invention have been described. Nevertheless, it will be understood that various modifications may be made without departing from the spirit and scope of the invention. Accordingly, other embodiments are within the scope of the following claims.

What is claimed is:

1. A system for transmitting data, comprising:
a first apparatus with a first communication device for setting up a first connection that is a local wireless point-to-point connection, wherein the first apparatus is one of a laser apparatus and a machine tool apparatus;
a second apparatus with a second communication device for setting up a second connection that is a local wireless point-to-point connection, wherein the second apparatus is one of a laser apparatus and a machine tool apparatus; and
a mobile terminal comprising a terminal data memory, and a terminal communication device for setting up local wireless point-to-point connections to the first apparatus and the second apparatus, wherein the only communication path between the first apparatus and the second apparatus is through the mobile terminal;
wherein the system is configured to:
transmit condition monitoring data of the first apparatus through the first connection to the mobile terminal,
buffer-store the condition monitoring data in the terminal data memory of the mobile terminal, and,
after the first connection terminates, transmit the condition monitoring data of the first apparatus from the mobile terminal through the second connection to the second apparatus.

2. The system of claim 1, wherein the first communication device, the second communication device, and the terminal communication device are configured as at least one of Bluetooth interfaces for setting up a Bluetooth connection, and WLAN interfaces for setting up a WLAN connection.

3. The system of claim 1, wherein the first apparatus has a data memory for storing the data to be transmitted to the mobile terminal.

4. The system of claim 1, wherein the data comprises notification data of the first apparatus and update data regarding the first apparatus.

5. The system of claim 1, wherein the condition monitoring data is used to synchronize the second apparatus with the first apparatus.

6. The system of claim 1, wherein the condition monitoring data includes at least one of a fault report and a status report associated with the first apparatus.

7. The system of claim 1, wherein the condition monitoring data includes a current measured value of a sensor system that monitors one or more components in the first apparatus.

8. The system of claim 1, wherein the condition monitoring data includes at least one of an apparatus data acquisition, an operational data acquisition, and service data of the first apparatus.

9. The system of claim 1, wherein the system is configured to transmit at least one of location data and time data of the mobile terminal through the second connection to the second apparatus.

10. A method for data interchange between a first apparatus and a second apparatus, wherein each of the first apparatus and the second apparatus is one of a laser apparatus and a machine tool apparatus and the first apparatus and the second apparatus are configured to communicate with one another only through the mobile terminal device, the method comprising:
setting up a first connection that is a local wireless point-to-point connection, between the first apparatus and a mobile terminal;
transmitting condition monitoring data of the first apparatus to the mobile terminal through the first connection;
buffer-storing the condition monitoring data in the mobile terminal;
terminating the first connection;
setting up a second connection that is a local wireless point-to-point connection, between the mobile terminal and the second apparatus;
transmitting the condition monitoring data of the first apparatus that is buffer-stored in the mobile terminal from the mobile terminal through the second connection to the second apparatus; and
terminating the second connection.

11. The method of claim 10, wherein at least one of the first connection and the second connection is set up based on a strength of a wireless signal received at the mobile terminal.

12. The method of claim 11, wherein multiple wireless signals are received at the mobile terminal, the multiple wireless signals being transmitted by multiple apparatuses, and among the multiple apparatuses, an apparatus with the strongest wireless signal at the mobile terminal, is one of the first apparatus and the second apparatuses.

13. The method of claim 10, wherein the first connection is used to transmit notification data of the first apparatus to the mobile terminal and send update data of the mobile terminal to the second apparatus.

14. The method of claim 10, wherein at least one of current location data and current time data of the mobile terminal is transmitted to at least one of the first apparatus and the second apparatus.

15. The method of claim 10, wherein the mobile terminal transmits access data for certifying the mobile terminal to at least one of the first apparatus and the second apparatus.

16. The method of claim 10, wherein after the mobile terminal enters a reception area of one of the first apparatus and the second apparatus, one of the first connection and the second connection is automatically set up.

17. The method of claim 10, wherein after at least one of the first connection and the second connections is set up, the data is transmitted automatically.

18. The method of claim 10, wherein the condition monitoring data is used to synchronize the second apparatus with the first apparatus.

19. The method of claim 10, wherein the condition monitoring data includes at least one of a fault report and a status report associated with the first apparatus.

20. A non-transitory computer program product, comprising instructions that when executed by a mobile terminal, causes the mobile terminal to perform operations comprising:
setting up a first connection that is a local wireless point-to-point connection, between a first apparatus and a mobile terminal, wherein the first apparatus is one of a laser apparatus and a machine tool apparatus;
transmitting condition monitoring data of the first apparatus to the mobile terminal through the first connection;
buffer-storing the condition monitoring data in the mobile terminal;
terminating the first connection;
setting up a second connection that is a local wireless point-to-point connection, between the mobile terminal and a second apparatus, wherein the second apparatus is one of a laser apparatus and a machine tool apparatus;

transmitting the condition monitoring data that is buffer-stored in the mobile terminal from the mobile terminal through the second connection to the second apparatus; and terminating the second connection.

\* \* \* \* \*